(12) United States Patent
Cooke et al.

(10) Patent No.: US 7,033,628 B2
(45) Date of Patent: Apr. 25, 2006

(54) METHOD OF PREPARING A FOOD PRODUCT

(76) Inventors: David Cooke, c/o Unilever Research Colworth, Colworth House, sharnbrook, Bedford, MK44 1LQ (GB); Timothy John Foster, c/o Unilever Research Colworth, Colworth House, sharnbrook, Bedford, MK44 1LQ (GB); Saskia Alexandra Galema, c/o Unilever Research Colworth, Colworth House, sharnbrook, Bedford, MK44 1LQ (GB); Adrianus Marinus Ledeboer, c/o Unilever Research Vlaardingen Olivier van Noortlaan 120, 3133 AT Vlaardingen (NL); Jan Willem Sanders, c/o Unilever Research Vlaardingen Olivier van Noortlaan 120, 3133 AT Vlaardingen (NL)

( * ) Notice: Subject to any disclaimer, the term of this patent is extended or adjusted under 35 U.S.C. 154(b) by 0 days.

(21) Appl. No.: 09/929,569

(22) Filed: Aug. 14, 2001

(65) Prior Publication Data
US 2002/0122844 A1 Sep. 5, 2002

(30) Foreign Application Priority Data
Aug. 14, 2000 (GB) .................................... 0020002

(51) Int. Cl.
*A23C 1/12* (2006.01)
(52) U.S. Cl. .......................................... 426/34; 426/43
(58) Field of Classification Search ................. 426/34, 426/42, 43, 583, 565, 582
See application file for complete search history.

(56) References Cited

U.S. PATENT DOCUMENTS

| 2,722,177 | A | 11/1955 | Routh |
| 4,110,476 | A | 8/1978 | Rhodes |
| 4,399,160 | A | 8/1983 | Schwartz et al. |
| 4,444,793 | A | 4/1984 | Schwartz et al. |
| 4,447,458 | A | 5/1984 | Roth et al. |
| 4,877,634 | A | 10/1989 | Pucci et al. |
| 5,223,431 | A | 6/1993 | Pucci et al. |
| 5,308,628 | A | 5/1994 | Schol et al. |
| 6,004,800 | A | 12/1999 | Aebischer et al. |
| 6,284,294 | B1 | 9/2001 | French et al. |
| 6,399,119 | B1 * | 6/2002 | Vandamme et al. .......... 426/18 |

FOREIGN PATENT DOCUMENTS

| DE | 195 10 601 A1 | 9/1996 |
| EP | 0 363 633 A1 | 4/1990 |
| EP | 0 818 154 A1 | 1/1998 |
| JP | 57-141264 * | 9/1982 |
| JP | 57-141265 * | 9/1982 |
| SU | 619165 A | 6/1978 |
| WO | 98/37770 | 9/1998 |

OTHER PUBLICATIONS

Gruter et al. "Structural characterization of the exopolysaccharide produced by *Lactobacillus delbruckii* subspecies bulgaricus RR grown in skimmed milk". Carbohydrate Research. vol. 239, Feb. 1993, p. 209-226 (abstract only).*
Hess et al. J. dairy Sci. 80(2): 252-263, 1997.*
Lamothe et al. "Genetic and biochemical charaterization of exopolysaccharide biosynthesis by *Lactobacillus delbrueckii* subsp. bulgaricus". Arch. Microbiol. vol. 178, 2002, p. 218-228.*
Kimmel et al. "Optimization of exopolysaccharide production by *Lactobacillus delbrueckii* subsp. bulgaricus RR grown in a semidefined medium". App. Environ. Microb. 64(2): 659-664. Feb. 1998.*

* cited by examiner

*Primary Examiner*—Keith Hendricks
(74) *Attorney, Agent, or Firm*—Gerard J. McGowan, Jr.

(57) ABSTRACT

A method for preparing a milk-based composition comprising a homopolysaccharide is provided whereby a mixture comprising milk and fermentable sugar is fermented with a homopolysaccharide-producing microorganism under anaerobic conditions, without regulating the pH, and the fermentation is stopped before the pH of the mixture drops below pH 5.5. Food products comprising such compositions are also provided.

12 Claims, 9 Drawing Sheets

Fig. 1.
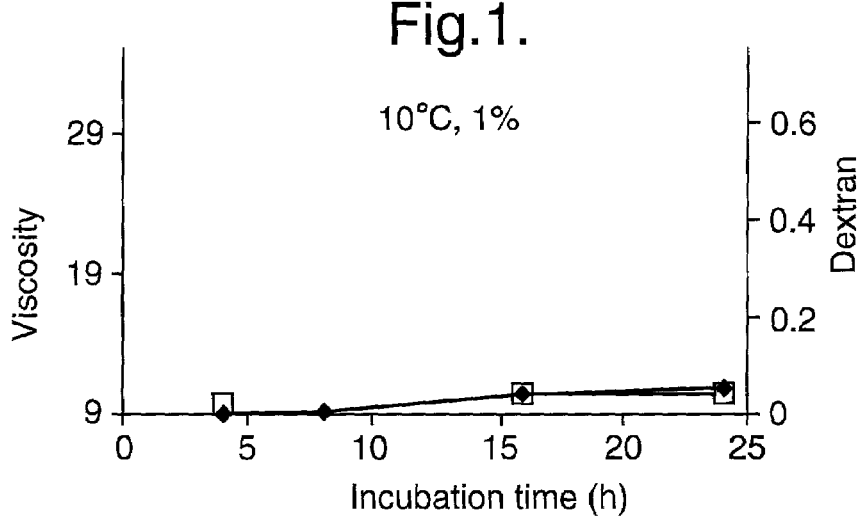
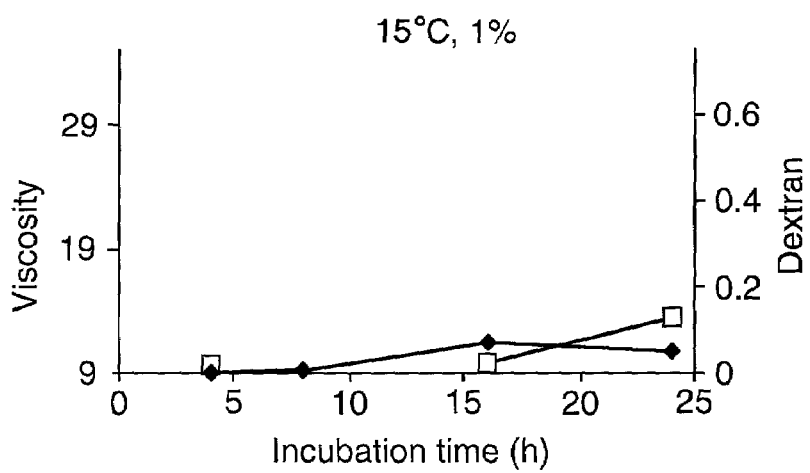
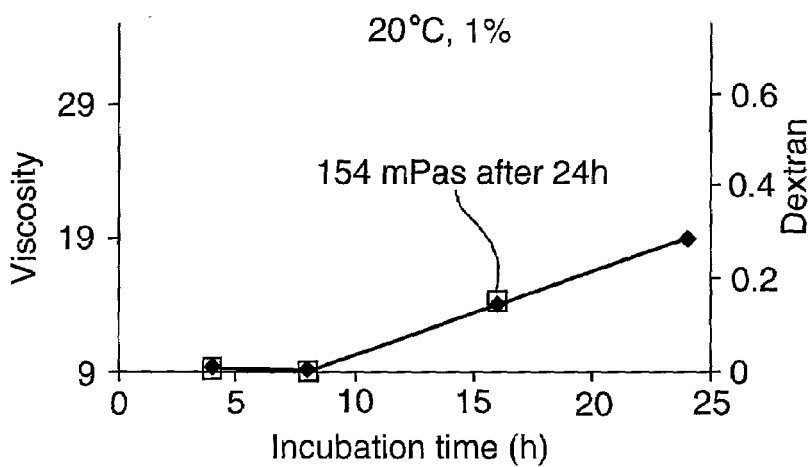

Fig. 3.
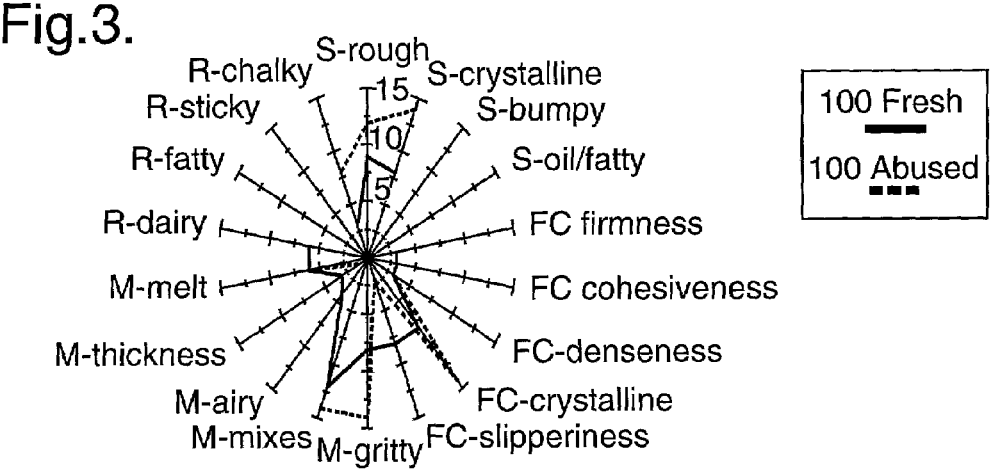
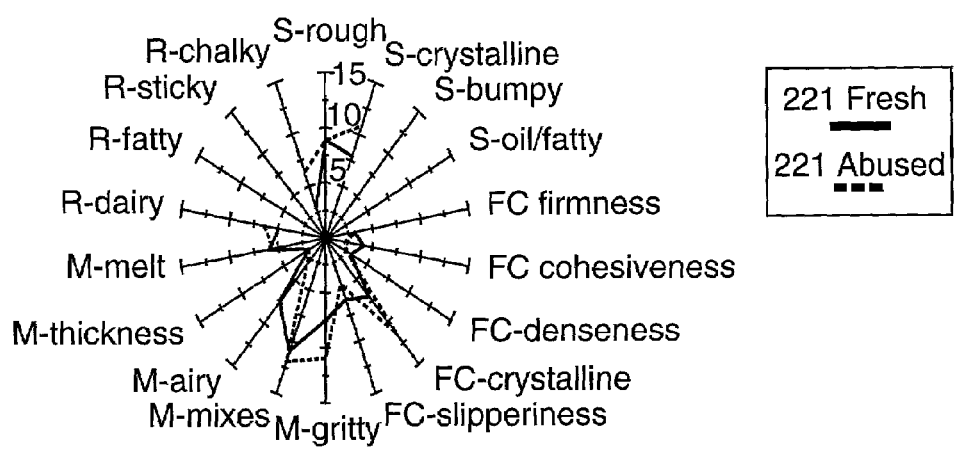
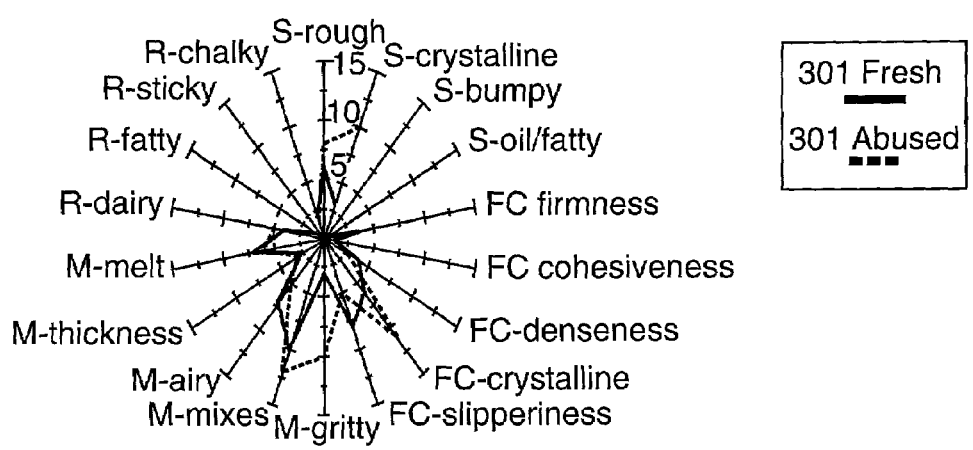

Fig.3A.
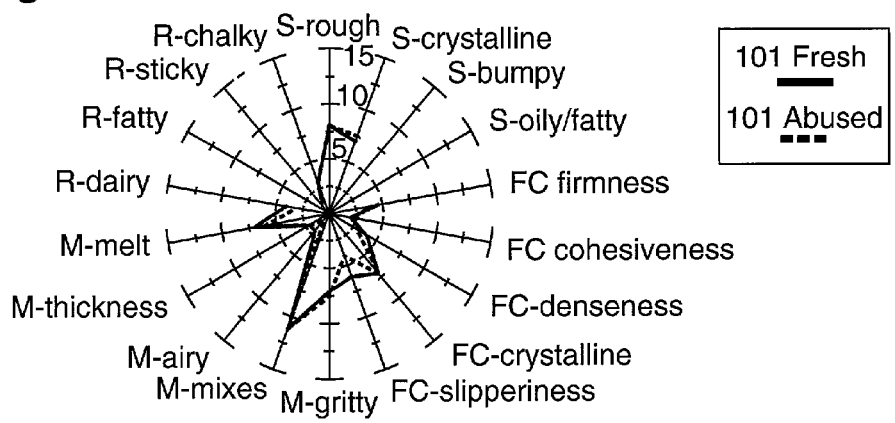
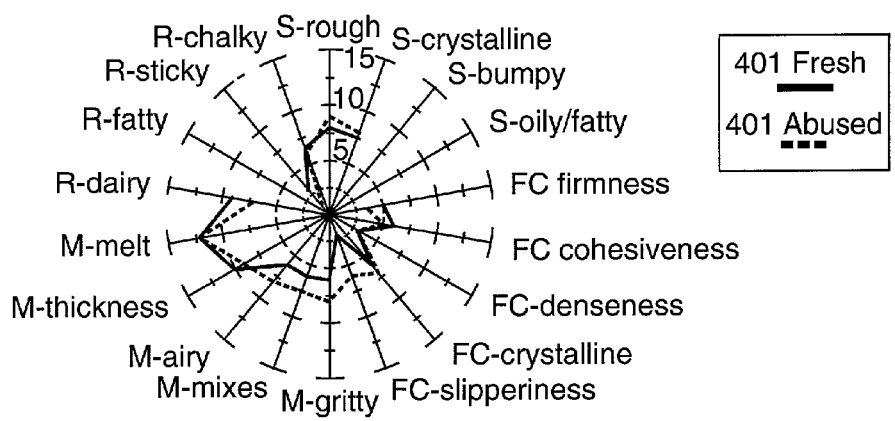
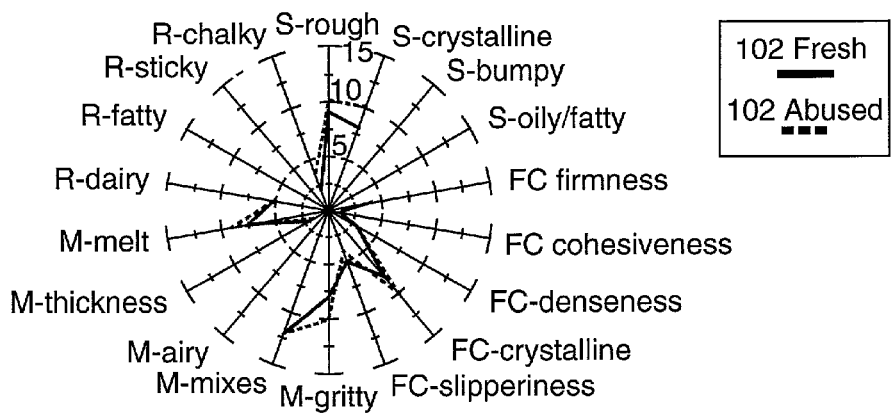

Fig.3B.
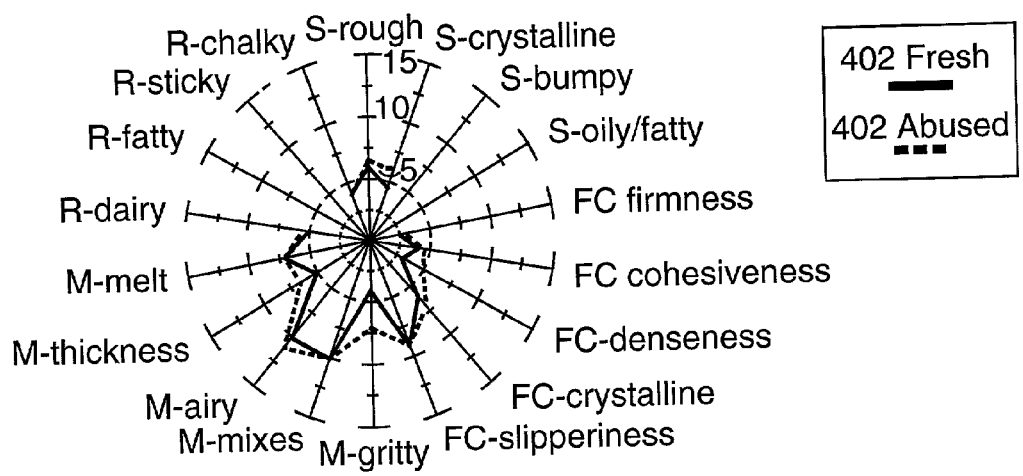
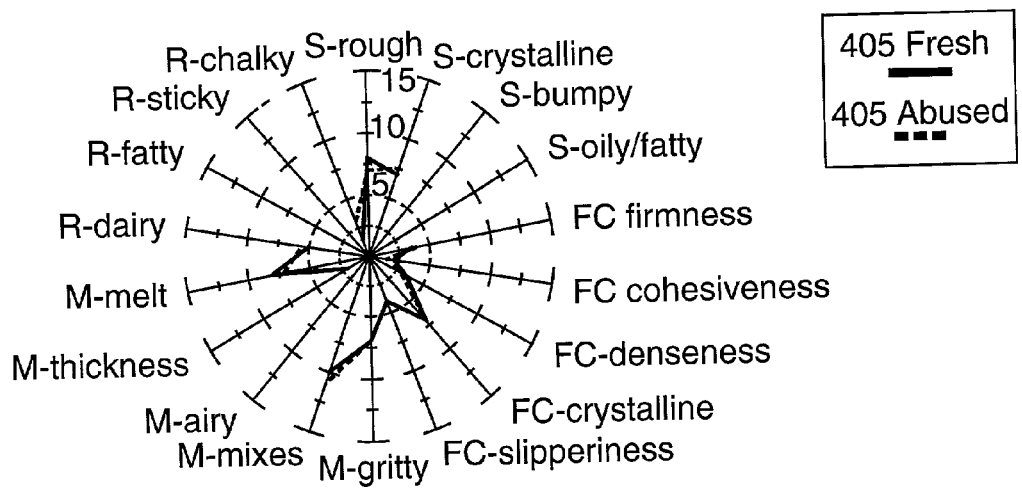

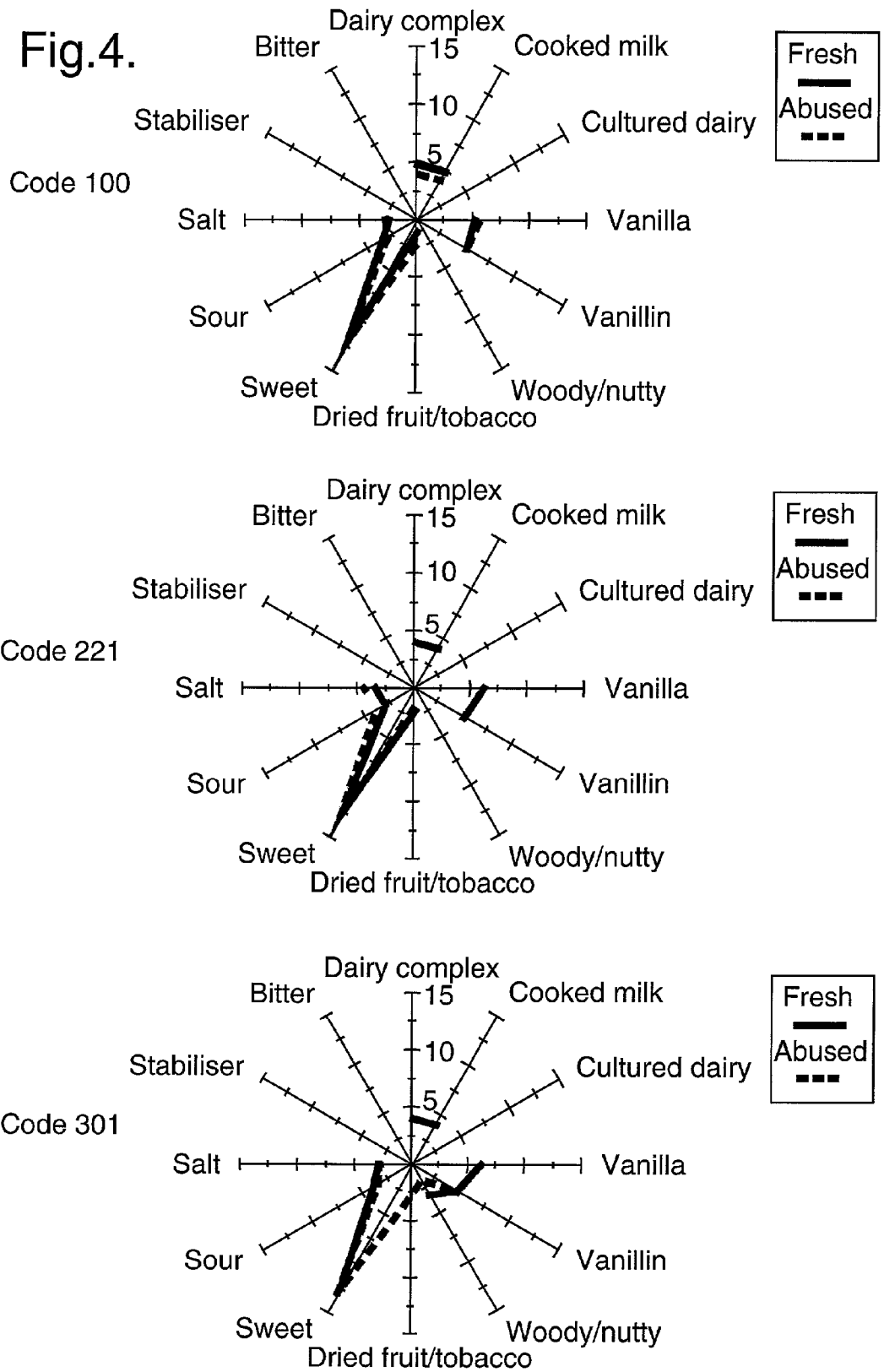

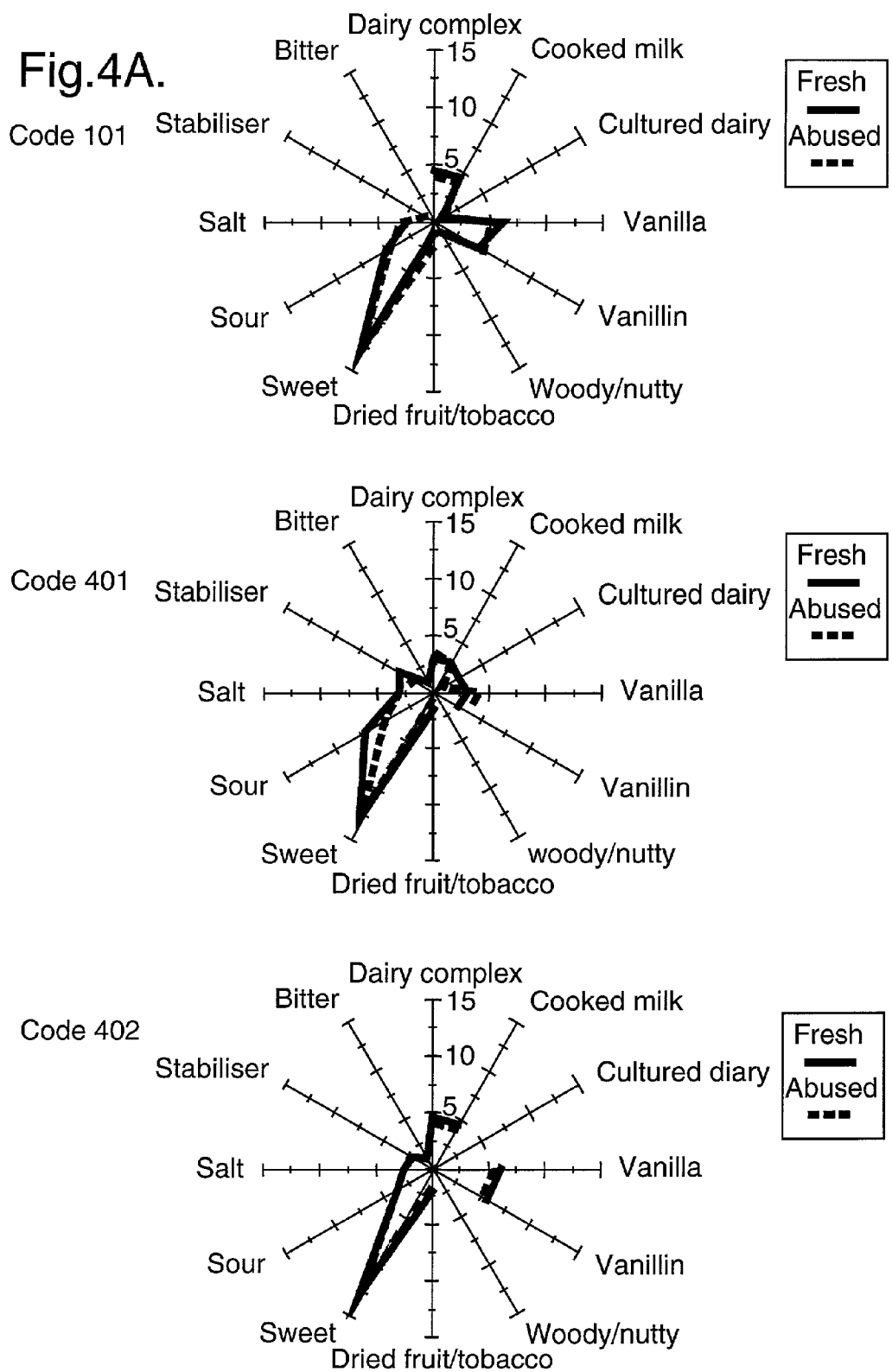

METHOD OF PREPARING A FOOD PRODUCT

FIELD OF THE INVENTION

The present invention relates to a method for preparing a food product. In particular, the invention relates to a method for preparing a milk-containing product exhibiting improved qualities of structure and texture, whereby the need to include a structuring/texturing aid as an additive ingredient is avoided.

BACKGROUND OF THE INVENTION

The development of food products having improved texture and structural properties and which do not exhibit storage stability problems is of considerable commercial interest. In the case of ice cream confections, for example, there is a particular need to devise improved methods of combating textural deterioration resulting from the formation of ice crystals caused by cyclic changes in the freezing temperature (temperature abuse). Various approaches to overcoming these problems have been described, typically involving the addition of conventional stabilising, thickening and/or structuring additives to the food product during preparation. Polysaccharides such as locust bean gum, guar gum and carrageenan, for example, are commonly added to mask the perception of ice crystals and to improve the texture of ice cream products. Other stabilising agents which are used in food products include homopolysaccharides produced extracellularly by certain bacteria, such as dextran and fructans. Spray-dried dextran-milk powder is available commercially from Quest International under the trade name "Enrich".

Dextrans are homopolysaccharides comprising glucose residues which are produced by the action of the enzyme dextransucrase on sucrose, these enzymes being produced primarily extracellularly by various lactic acid bacteria including strains from the genera *Streptococcus, Leuconostoc* and *Lactobacillus*.

Controlled fermentation of a whey-based medium containing sucrose with the dextran-producing bacterium *Leuconostoc mesenteroides* ATCC 14935 to produce a thickening agent for use in foods is described in U.S. Pat. No. 4,444,793. The desired dextran content is produced by prolonged fermentation during which excessive acidification is avoided either by inclusion of buffer salts in the growth medium or by titration with base during fermentation.

U.S. Pat. No. 4,877,634 describes the preparation of a spray-dried dextran and levan (polyfructose) containing composition which gives high viscosity when rehydrated, by fermenting an aqueous growth medium comprising sucrose with *Leuconostoc dextranicum* NRRL-B-18132. The use of this composition to improve the thickness, stability or texture of food products, including milk drinks, salad dressings, ice cream and frozen yoghurt is also described. The production of dextran from another *Leuconostoc dextranicum* strain (NRRL-B-18242) and its use, preferably in the form of a dried rehydratable powder, as a texture modifying or improving additive in a similar range of foods is described in U.S. Pat. No. 5,223,431.

According to the taxonomy established by Garvie et al (International Journal of Systematic Bacteriology, 118-119, 1983), bacteria of the genus *Leuconostoc*, previously classified as *Leuconostoc mesenteroides, Leuconostoc dextranicum* and *Leuconostoc cremoris*, are subspecies of *Leuconostoc mesenteroides*. In addition to the dextran producing subspecies of *Leuconostoc mesenteroides* mentioned above, two further dextran producing strains of use in texturing food products have been described in the literature, namely *Leuconostoc mesenteroides* ssp. *cremoris* strains CNCM I-1692 and CNCM-I-1693 (see U.S. Pat. No. 6,004,800).

As polysaccharides such as dextran are prepared by anaerobic fermentation of polysaccharide producing strains of lactic acid bacteria, their production is necessarily accompanied by the production of acid (and hence a lowering of pH) as a by-product of anaerobic metabolism. This has generally been regarded as limiting the applicability of methods for producing dextran by microbial fermentation in situ in the food product, itself particularly in the case of pH sensitive foods such as those containing milk proteins where lowering the pH can have marked effects on product texture, processability, stability and flavour. Where the product is, for example, a yoghurt or yoghurt-ice, the preparation of which normally involves acidification, this may present no problem but more generally the effects of a substantial drop in pH, especially in combination with high temperature when pasteurisation is necessary after the fermentation step, are likely to be highly detrimental to the quality of the product.

In those instances discussed above where dextran has been proposed as a suitable stabilising and texturing aid for ice cream products, for example, it is notable that it is always added in the form of a pre-prepared, pH adjusted additive. U.S. Pat. No. 6,004,800 describes the formation of an ice cream where dextran is produced during the manufacturing process (by a method which would not be subject to the problems associated with microbial metabolism) but again this involves the addition of an additive (here the purified enzyme, active dextransucrase) which has undesirable implications in terms of cost and consumer acceptability.

By contrast, instances of the production of polysaccharide texturing/structuring agents by fermentation in situ in yoghurt manufacture have been reported in the literature; here, where acid production is both a normal and desired part of the production process, the drop in pH accompanying fermentation does not present problems.

U.S. Pat. No. 6,004,800 (mentioned above) describes the preparation of a yoghurt of acceptable texture and taste by fermentation of dextran producing *Leuconostoc mesenteroides* ssp. *cremoris* CNCM I-1692 (together with non-thickening strains of *Streptococcus thermophilus* and *Lactobacillus bulgaricus*) in the presence of a milk-sucrose medium until the pH reaches a value of 4.5. This reference also discloses yoghurt formation using the enzyme dextransucrase, produced by *Leuconostoc mesenteroides* ssp *cremoris*, in the presence of sucrose to produce dextran in situ. In another example U.S. Pat. No. 5,308,628 describes the preparation of a thickener-free, yoghurt-based dairy dessert by culturing *Lactobacillus acidophilus, Lactobacillus bifidus* and/or *Streptococcus thermophilus* with various milk constituents to a pH between pH 4.3 and pH 5.5, so that the viscosity of the product is increased to an acceptable level.

Not only is the use of additives to improve the structure and texture of ice creams disadvantageous in economic terms but it is also undesirable in the light of increasing consumer desire for additive-free food products. There therefore remains a clear need for the development of improved methods for preparing ice cream confections and other milk containing products having improved structure and stability properties whilst avoiding the use of additives.

SUMMARY OF THE INVENTION

The present invention provides in a first aspect a method for preparing a milk-based composition comprising a homopolysaccharide comprising the steps of
(i) fermenting a mixture comprising milk and a fermentable sugar with a homopolysaccharide-producing microorganism under anaerobic conditions, and
(ii) stopping the fermentation before the pH of the mixture drops below pH 5.5, the pH of said mixture being unregulated during fermentation.

The invention also provides a food product comprising a composition prepared according to the first aspect.

In a preferred aspect, the invention provides a method of preparing an ice cream pre-mix according to the first aspect and a method of preparing an ice cream confection, comprising pasteurising an ice-cream pre-mix prepared according to the first aspect and aerating and freezing said pasteurised pre-mix.

Also provided is a composition comprising an ice-cream pre-mix and a homopolysaccharide-producing microorganism.

The invention further provides a method of using a homopolysaccharide-producing microorganism to produce a polysaccharide in situ in a milk based food product, wherein a mixture comprising a milk and a fermentable sugar is fermented with said microorganism, and wherein the pH of this mixture, while not being regulated, remains at or above pH 5.5.

Also provided is an ice cream confection prepared from an ice cream pre-mix in which a polysaccharide is produced in situ according to the method of the invention, optionally combined with a variable proportion of unfermented pre-mix.

As used herein, "milk" should be understood to include animal or vegetable milks (such as soya milk) which may suitably be incorporated into the compositions according to the invention in the form of liquid milk, cream, skimmed milk, milk powder or skimmed milk powder. However, derivatives of milk, such as whey, from which the solid protein component of the milk has been substantially removed are not included.

By "being unregulated" or "not being regulated" is meant that the pH is not artificially maintained (for example, by inclusion of buffer salts in the growth medium or by titration with base) in the desired range during fermentation.

An "ice cream pre-mix" is a mixture of milk constituents, sugars and optionally emulsifying agents, flavouring materials or other components conventional in ice cream from which an ice cream confection is prepared following pasteurisation, and freezing with aeration.

The present invention may be more fully understood with reference to the following description when read together with the accompanying drawings.

BRIEF DESCRIPTION OF THE DRAWINGS

FIGS. 3 to 3B show Spectrum sensory plots of the texture qualities of ice creams prepared from various pre-mix formulations.

FIGS. 4 to 4A show Spectrum sensory plots of the flavour qualities of ice creams prepared from various pre-mix formulations.

DETAILED DESCRIPTION OF THE INVENTION

Figure 1:
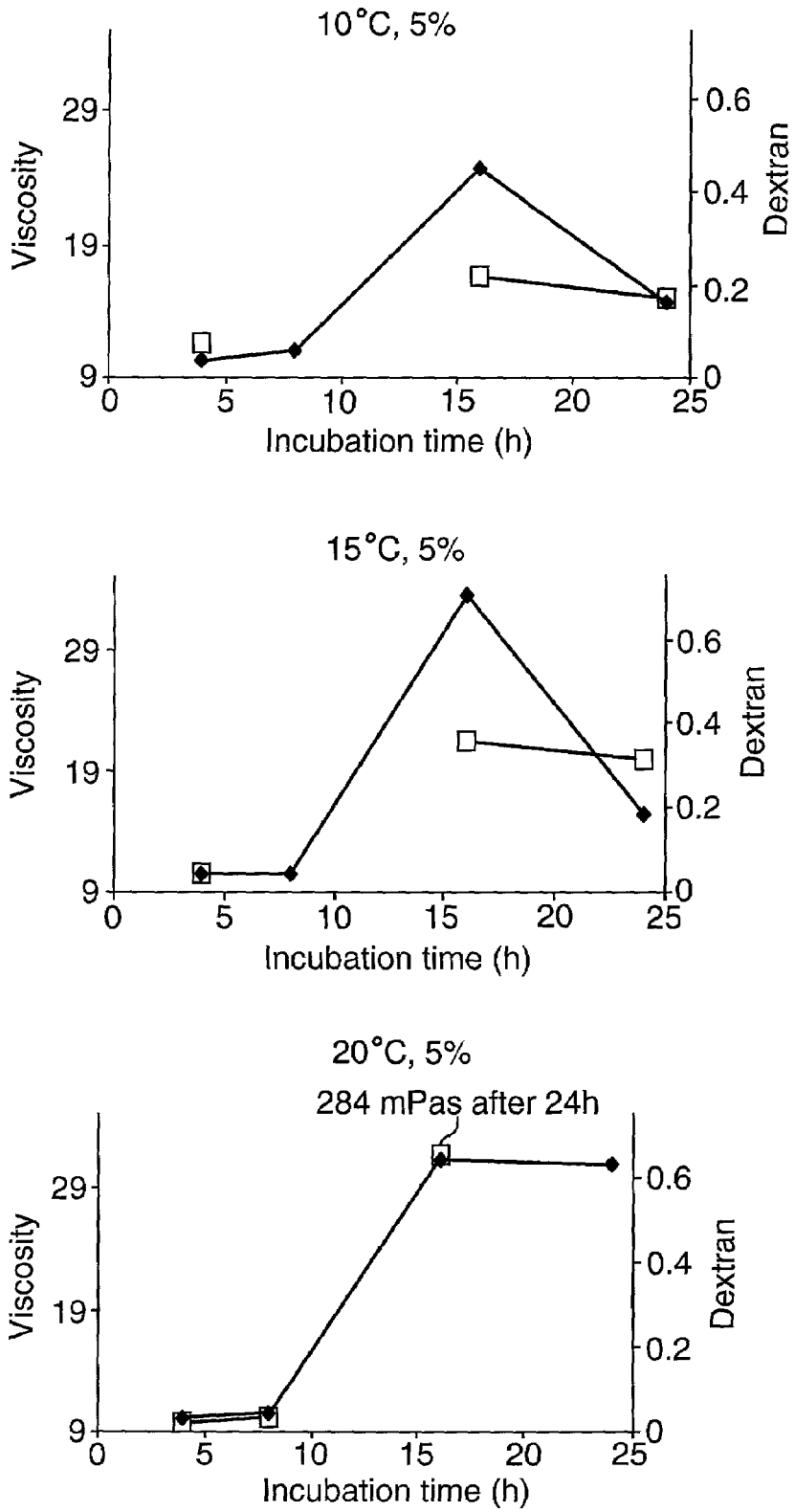
FIG. 1 shows the time development of viscosity (□) in mPas and dextran content in mg/ml (♦) in an ice cream pre-mix during fermentation with *L. mesenteroides* ATCC10830A. The incubation temperatures and inoculation levels (v/v %) are indicated above each graph. The viscosity was measured before pasteurisation, at a shear rate of 250 s$^{-1}$.

The invention is based on the finding that a milk-based food product with improved structure and stability may be prepared from a polysaccharide-containing mixture wherein the polysaccharide is produced in situ in the mixture by fermentation with a polysaccharide-producing microorganism under anaerobic conditions, the pH during fermentation remaining, without being regulated, at or above pH 5.5, particularly in the range from pH 5.5 to 7.0.

Contrary to the expectation from the art that the accompanying drop in pH renders the in situ production of polysaccharides by microbial fermentation unsuitable for use in the production of acid-sensitive foods, such as those containing milk proteins, the present inventors have surprisingly found that, by selection of an appropriate microorganism and control of the fermentation conditions, it is possible to achieve a balance between polysaccharide production and acidification in the fermentation process such that a polysaccharide-containing product of good structure and stability, with no impairment texture or flavour, may be produced.

Experience with milk-based products such as ice cream suggests that a "cultured milk flavour" tends to become detectable at pH values below about 5.8 which, while acceptable in some products such as yoghurt, is otherwise undesirable. However the present inventors have found that this flavour can be masked by mixing the fermented mixture with unfermented mixture, whilst still retaining the beneficial structuring effects of in situ-generated polysaccharide. Below pH 5.5, however, protein aggregation becomes significant, leading to noticeable textural changes in the food product, especially if it has to be pasteurised. These changes in the milk proteins are not reversible and therefore cannot fully be ameliorated by dilution with unfermented mixture. With, once again, the exception of normally acidic products such as yoghurt, this effect is very undesirable and pH 5.5 is, therefore, an effective lower limit to which the pH may be allowed to drop for the purposes of this invention. Preferably the pH remains in the range between 5.5 and 7.0, particularly between 5.7 and 6.2, most preferably between 5.8 and 6.2.

It would, of course, be possible to maintain the pH of the mixture during the fermentation process within the desired range artificially, for example by controlled addition of a base using a pH-stat or by addition of buffer salts, but this is both technically inconvenient and undesirable in the preparation of food products, particularly where a 'natural' preparation is desired. It is a particular advantage of the method of the present invention that additional technical steps of this nature are not required.

The production of polysaccharide in situ from sugars present in the mixture by a natural fermentation process affords the possibility of avoiding the need to add stabilising or structuring additives to achieve acceptable product structure and texture, leading to substantial savings in cost and also improved consumer acceptability.

In situ polysaccharide production can also provide additional benefits in flavour generation: polysaccharides added in conventional dried form can lead to flavour deterioration resulting from loss of flavour or occurrence of off-flavours such as cardboard flavours caused by the drying step. Furthermore, in order to obtain as high as possible a polysaccharide content in the additive (so as to keep any residual material introduced during preparation of the polysaccharide to a minimum and hence to minimise its undesirable effect on the properties of the final product), it is necessary to ferment the preparation for a long time. This leads to a drop in pH and the development of soured milk/cultured dairy flavours in the final product.

The invention is applicable to any food product based on a mixture comprising milk and a fermentable sugar, wherein the mixture has a pH value at or above 5.5, especially between 5.5 and 7.0. In a preferred embodiment, the product is an ice cream pre-mix. It will be appreciated that, although the invention is described herein primarily with reference to ice cream, it is applicable to other products such as sherbets, ice milks, sorbets, frozen custards and salad dressings.

The polysaccharide to be generated in situ according to the invention is a homopolysaccharide produced extracellularly under anaerobic conditions by a microorganism. Bacteria which produce heteropolysaccharides generally do so at much lower levels, in comparison, and it is unlikely that the desired levels could be produced in situ while the pH remained in an acceptable range. In a particularly preferred embodiment the polysaccharide is dextran, produced from sucrose present in the precursor mixture. Other suitable polysaccharides would include fructans such as levan.

The invention is applicable to any microorganism which is capable of producing extracellular homopolysaccharides (composed of one type of glycopyranose residue) on fermentation with a suitable sugar under anaerobic conditions provided that the rate of polysaccharide production compared to rate of acidification is such that the pH of the mixture remains at or above pH 5.5 during fermentation. Suitably, the microorganism for use according to the invention is a homopolysaccharide-producing lactic acid bacterium. Preferred homopolysaccharide-producing lactic acid bacteria are dextran (glucose polymer) and/or fructan (fructose polymer) producing strains of the genus *Leuconostoc*, such as the subspecies of *Leuconostoc mesenteroides*, *Leuconostoc dextranicum* NRRL-B-18132 and NRRL-B-18242, *Leuconostoc mesenteroides* ssp *cremoris* strains CNCM I-1692 and CNCM-I-1693 described in U.S. Pat. No. 4,444,793, U.S. Pat. No. 4,877,634, U.S. Pat. No. 5,223431 and U.S. Pat. No. 6,004,800 respectively, mentioned above.

According to a particularly preferred embodiment, the polysaccharide producing microorganism is a dextran-producing *Leuconostoc mesenteroides* ssp *mesenteroides* strain, such as *Leuconostoc mesenteroides* ssp *mesenteroides* ATCC 10830, or ATCC 27258, or especially ATCC 10830A. An alternative preferred microorganism is *Leuconostoc mesenteroides* ssp *dextranicum* 605.

Where the mixture for use according to the invention is an ice cream pre-mix, this may be any conventional formulation and may suitably comprise milk solids (either fat or non-fat solids), sucrose, water and optionally other sugars, corn syrup, flavourings any other additional components generally used in ice cream formulation. The fat content of the pre-mix is not critical to the present method and fats may optionally be included from butterfat, cream or vegetable sources. The pre-mix may be prepared by admixture of the ingredients in the proportions generally employed in the art.

By means of the invention, polysaccharide is produced in situ in the mixture in an amount sufficient to achieve the desired structure/texture benefits in the processed food product but at a rate which does not lead to an unacceptable drop in pH of the mixture. In the case of an ice cream pre-mix, the polysaccharide level achieved should desirably be at least 0.3% by weight of the pre-mix, preferably 0.5% to 0.7% by weight.

These values may vary somewhat for other types of food material but are likely to be in a similar range. It will be appreciated that the desired polysaccharide level may vary within this range, depending on the formulation of the product. For example, it would be expected that the desired polysaccharide level would generally be different and may be higher for products with a high fat content than for those with less fat.

A fermentable sugar is required in the mixture both as a substrate for polysaccharide production and, typically, to provide sweetness in the food product. Where the polysaccharide to be produced is dextran, the sugar will be sucrose. In a preferred embodiment, where the product is an ice cream pre-mix, an amount of sucrose (before fermentation) of from 1% to 17.5% by weight, preferably from 7.5% to 15% by weight, should suitably be present. The inventors have found it particularly convenient to use a pre-mix comprising 15% by weight sucrose (a level that is conventional in ice cream formulation) in the fermentation, as this optimises polysaccharide production whilst leaving remaining sufficient unmetabolised sucrose that the need to add additional sucrose post fermentation to achieve acceptable taste properties in the final product is avoided.

The milk-containing mixture may conveniently be inoculated with a preculture (grown in any suitable food-grade medium) of a homopolysaccharide-producing microorganism, in an amount of from 0.01% to 5% of the volume of the mixture. In a preferred embodiment the mixture may be inoculated using frozen beadlets comprising a preculture of the microorganism, conveniently in an amount of from 0.02 to 1% of the mixture volume. Suitably, *Leuconostoc mesenteroides* ssp *Dextranicum* 605, which is commercially available (Danisco) in direct vat system (beads) may be used.

The anaerobic fermentation may conveniently be carried out at a temperature of from 10° C. to 30° C., for a time period of from 4 to 48 hours. It will, of course, be appreciated that the desired polysaccharide content of the mixture can be achieved by using a variety of combinations of these parameters; suitable combinations can be established straightforwardly without the need for undue experimentation. The inventors have shown that the accumulation of polysaccharide, as reflected in the changing viscosity of the fermenting mixture, correlates approximately linearly with the easily monitored pH of the mixture (provided, of course, that the pH does not drop to a point where gelation occurs), thus further facilitating the process of optimisation of the fermentation conditions.

Fermentation conditions may be chosen to yield a mixture that is suitable as a food product, or that can be processed directly to produce the final food product after fermentation and pasteurisation. More preferably, however, the fermented mixture may be modified by the incorporation of additional desired ingredients. According to one embodiment, the fermented mixture may be diluted with non-fermented mixture in order to achieve optimal polysaccharide content (and hence viscosity) prior to further processing. The non-fermented mixture may have the same composition as the fermented mixture had prior to fermentation, or it may be different. This approach has the advantage that the conditions for optimal polysaccharide production need not be compromised by the demands of the final product composition. Additional potential advantages are that the amount of material that needs to be fermented is reduced, a single batch of fermented mixture may be incorporated into a range of different final products, and any off-flavours developed during fermentation can be masked by dilution.

When the desired composition has been achieved, polysaccharide production in the mixture may conveniently be ended by pasteurisation. This would also help to improve the viscosity of the product. Alternatively, where it is appropriate to the particular product, it may effectively be stopped simply by cooling or freezing. The resulting mixture may then constitute the final product or it may be converted to the product by further steps which may include incorporation of additional components such as flavourings and supplementary sugars, and any conventional physical processing steps. Where the mixture is an ice cream pre-mix, conversion of the fermented, and optionally pasteurised and blended pre-mix to ice cream would involve conventional processing steps including aeration and freezing.

The following examples are provided by way of illustration only.

EXAMPLE 1

General Methods for Investigating In Situ Polysaccharide Production in Ice Cream Pre-Mixes.

(i) Culturing Protocol for *Leuconostoc mesenteroides* in Ice Cream Pre-Mix.

Starter culture: A frozen stock (1 ml) of *Leuconostoc mesenteroides* subsp. *mesenteroides* ATCC10830A was thawed and transferred aseptically into 100 ml of XVM medium$^a$+10% sucrose. This was incubated at 25° C. for 24 hours (or longer, until it had become viscous and the pH had dropped below 5.0).

Frozen stock cultures for long term storage: A full grown starter culture, with a cell density of approximately $10^9$ cells/ml was mixed with sterile glycerol to a final concentration of 10%. 1 ml aliquots were dispensed into sterile screw capped tubes and stored at −80° C. for later use.

Preparation of a preculture. A volume of XVM medium+10% sucrose, sufficient for subsequent inoculation of the ice cream pre-mix (typically 1 to 5% of the pre-mix volume), was prepared and inoculated aseptically with $\frac{1}{100}$ volume of the starter culture. This was incubated at 25° C. for 24 hours by which time the culture should have become viscous and its pH should have fallen below 5.0.

Culturing of a pre-mix batch. A chosen amount of preculture (typically 1 to 5%) was added aseptically to the pasteurised pre-mix batch and incubated under the conditions chosen for investigation. Samples of the preculture and of the pre-mix immediately after inoculation were taken for microbiological evaluation (plate count). The pH and viscosity of samples of the pre-mix were measured at the start of fermentation and at intervals later on to monitor polysaccharide production.

$^a$XVM medium was prepared by combining 90 g skimmed milk powder, 3.5 g yeast extract (Difco) and 3.5 g peptone (Difco) with 1 liter water. The mixture was autoclaved at 110° C. for 15 min. A 60% (w/v) sucrose stock was prepared separately and autoclaved at 120° C. for 20 min. XVM+10% sucrose was prepared by mixing ⅙ volume of the sucrose stock solution with XVM in a sterile bottle.

(ii) Determination of Dextran Content of Ice Cream Pre-mixes.

For the Experiments Described in Examples 2 and 3: 7.5 ml 60% (w/w) trichloroacetic acid solution was added to a 30 ml sample of fermented pre-mix and the mixture stirred thoroughly for 45 minutes. The sample was then centrifuged for 45 minutes at 5000 r.p.m. in a Sorvall HS-4 rotor. 25 ml of supernatant was collected and the pH adjusted to 4.0 using 10 N NaOH. 15 ml of this material was then dialysed for 24 hours against regularly refreshed demineralised water using a pre-treated dialysis tube (previously boiled in 2% w/v $NaHCO_3$ solution and then demineralised water). The contents of the dialysis tube were then frozen at −40° C. and freeze-dried. The dry sample was dissolved in 1 ml 100 mM $NaNO_3$ containing 200 ppm $NaN_3$ and centrifuged at 5000 r.p.m. for 5 minutes.

Gel permeation chromatography was carried out using a PL-GFC 8 μm guard column (50×7.5 mm), a TSK gel G6000PW 17 μm column, (TosoHaas), a PL-GFC 4000A 8 μm column and a PL-GFC 1000A 8 μm column (Polymer Laboratories) at 45° C. (all columns were 300×7.5 mm). The sample was introduced into the GPC system using 100 mM $NaNO_3$ solution (containing 200 ppm $NaN_3$) as eluent. The polysaccharide present was detected using a refractive index detector. Concentrations were calculated using a calibration curve established for purified dextran with an average molecular weight of $7 \times 10^5$ Da, at concentrations of 0.2, 0.4, 1.1 and 1.6 mg/ml. The molecular weight of the dextran was determined by laser light scattering (TRALLS) using a mini-DAWN detector.

For the Experiments Described in Example 5: To 31 g of melted ice cream were added 7.5 ml of 60% w/v trichloroacetic acid (Fisher Chemicals A.R. grade) and the mixture was stirred for 45 minutes.

The mixture was centrifuged at 10,000 r.p.m. (12,000×g) for 30 minutes at 5° C. to sediment the proteins, cream the fats and give a clear supernatant. The supernatant was removed and its pH adjusted by addition of 10M sodium hydroxide solution to between 4.0 and 4.5.

The mixture was transferred to previously washed (5 min in boiling de-ionised water) dialysis tubing (Visking 19 mm inflated diameter cellulose—Molecular weight cut-off 12,000 to 14,000). The samples were allowed to dialyse for three days with three changes of de-ionised water per day at 4° C. The contents of the dialysis bags were freeze dried and the residue weighed.

Samples of this material were then analysed for dextran content by High Performance Size Exclusion with Multi-Angle Laser Light Scattering (HPSEC-MALLS). Sample solutions (0.5%) were prepared in 0.1M sodium nitrate, filtered through a 0.45 μm filter (PVDF, Whatman) to remove any remaining fat and then heated to 45° C. The dissolved sample (200 μl) was applied to the SEC-MALLS-RI system via a Rheodyne injection valve.

The chromatography system consisted of a Gilson pump (model 305), Anagel-TSK $PW_{XL}$ G4000, G5000 and G6000 columns in series (7.8×300 mm, Anachem), in combination with a TSK $PW_{XL}$ guard column (6.0×40 mm). Columns were eluted with 0.1M sodium nitrate filtered under vacuum through a 0.02 μm membrane (Anodisc 47, Whatman) and degassed under vacuum. The flow rate was 0.5 ml/min. Light scattering was detected by a DAWN-F MALLS photometer equipped with a K5 flow cell (n=1.52064) and a high temperature read head. The photometer light source was a He—Ne laser, 633 nm, 5 mW (Wyatt Technology, Santa Barbara, Calif.). The MALLS detector and columns were operated at a temperature of 45° C. A Wyatt Optilab Interferometric Refractometer with a measuring wavelength of 633 nm was used at a temperature of 45° C.

Prior to the measurements, the DAWN-F MALLS photometer was calibrated and normalised. The calibration constant was determined by measuring the scattering (at the 90° detector) from a pure solvent (toluene), with known Rayleigh ratio. All other detectors were normalised to the calibrated detector by measuring the scattering from a sample of P50 (~50 kDa MW) Pullulan standard (Showa Denko, Japan) which scatters light isotropically i.e. equally in all directions. The performance of the columns was also checked using pullulan standards ranging from 5 to 800 kDa.

(iii) Determination of Viscosity of Ice-Cream Pre-Mixes.

For the Experiments Described in Examples 3 and 4:

Viscosity was measured at 10° C. on a Carrimed CSL50 rheometer, with an acrylic cone, 6 cm and 2° angle. Readings were taken at 50 s$^{-1}$ and 250 s$^{-1}$.

For the Experiments Described in Example 5: Viscosity was determined using a Haake VT500 rheometer with a MV1 sensor. Measurements were made at 5° C. A shear rate sweep from 0 to 300 s$^{-1}$ over 5 minutes was made and the viscosity values recorded. Viscosities at 50 s$^{-1}$ are given in example 5.

(iv) Preparation of Ice Cream from Pre-Mixes

Ice cream was prepared using a standard continuous scrape surface heat exchange freezer. The target over-run was around 100%, and this was achieved for most products.

(v) Sensory Data Analysis.

Sensory and flavour properties of products prepared according to the invention were assessed using the Spectrum (Trade Mark) Descriptive Analysis (SDA) method, as described in 'Sensory Evaluation Techniques', (Meilgaard, Civille, Carr, 2$^{nd}$ edition, 1991, ISBN 0-8493-4280-5), see pages 196–198 and Munoz, Civille, 1998, J. Sensory Studies, 13, 57–75.

Both fresh and 'temperature abused' samples were evauluated. Temperature abuse was carried out by tempering at −25° C. for one week after production, then alternating between −10° C. and −25° C. for 12 hour periods, consecutively for 2 weeks.

Ice cream samples were brought into the preparation area 10 minutes prior to evaluation, in an insulated cooler. Samples were then removed from their containers and cut into approximately 64 ml cubes which were placed in 3 oz souffle cups for presentation to the panellists. Samples were evaluated when the sample temperature was between 10° and 15° F. Panellists evaluated the sample by scooping approximately ⅓ of the portion block with a heavyweight plastic spoon then evaluating the product for flavour and texture. Panellists were allowed another cube if needed. Panellists expectorated the samples after evaluation.

EXAMPLE 2

Dextran Production by *Leuconostoc mesenteroides* in an Ice Cream Pre-Mix: Dependence on Sucrose Concentration Ice cream premixes containing 14% skimmed milk powder in demineralised water and varying amounts of sucrose were inoculated with 1% v/v of a preculture of *L. mesenteroides* strain ATCC10830A, grown in fortified milk (XVM medium). The premixes were incubated for 24 hours at various temperatures and the accumulated concentrations of dextran were then determined. The results, expressed as % w/v dextran, are summarised in the following table:

| Initial sucrose content[a] | 5 | 7.5 | 10 | 12.5 | 15 | 17.5 |
|---|---|---|---|---|---|---|
| Temp (° C.) | | | | | | |
| 23 | 0.51 | 0.83 | 0.79 | 0.59 | 1.29 | 0.37 |
| 16 | — | — | 0.76 | 0.89 | 0.79 | 0.81 |
| 11 | — | — | 0.10 | 0.15 | 0.13 | 0.07 |

[a]Expressed as % (w/v)
(— indicates not determined)

The results demonstrate that the amount of dextran formed is not strongly dependent on the initial sucrose concentration, at least in the range from 7.5% to 15%, though there is some decrease in yield at concentrations outside this range. This means that a typical pre-mix containing 15% sucrose can be used for fermentation, avoiding the need for addition of additional sugar after fermentation.

EXAMPLE 3

Optimisation of Growth Conditions for *L. mesenteroides* ATCC10830A in an Ice Cream Pre-Mix Containing 15% Sucrose Samples of pre-mix as in example 2, and containing 15% sucrose initially, were inoculated with a preculture of *L. mesenteroides* ATCC10830A (inoculation volumes of 1% and 5% were investigated) and incubated at various temperatures and for various lengths of time. The dextran concentration and viscosity of each sample were then determined. The results are summarised in FIG. 1.

The accumulation of dextran, and hence the viscosity of the pre-mix remained very low during the first 8 hours of fermentation at all temperatures. After 24 hours there was a marked increase in viscosity, compared to that of an unfermented control sample, at all incubation temperatures, though the effect was greater at the higher temperatures. Incubation for longer than 24 hours resulted in highly viscous mixtures. For all incubation times and temperatures tested, inoculation with 5% v/v of preculture gave higher viscosities than inoculation with 1%.

It is clear from the data that a desired viscosity or dextran concentration can be achieved with various combinations of these parameters. For example, a viscosity of around 15 mPas (determined at a shear rate of 250 s$^{-1}$), which is suitable for a typical ice cream product, is obtainable by incubation at 10° C. for 16 hours with a 5% inoculation, or at 15° C. for between 8 and 16 hours with a 1% inoculation. Equally, the target viscosity or dextran content could be achieved by dilution of a fermented premix with a higher dextran content with unfermented premix.

EXAMPLE 4

Effect on the pH of an Ice Cream Pre-Mix Containing 15% Sucrose of Fermentation with *L. mesenteroides* ATCC10830A.

The proliferation of the bacteria and the culture pH were monitored during the fermentation tests described in example 3. The number of cells per gram of pre-mix at inoculation was found to be $1.3 \times 10^7$ for a 1% inoculation and $6.7 \times 10^7$ for a 5% inoculation. These values had increased to $1.1 \times 10^8$ (1% inoculation, incubated at 10° C.) and $1.3 \times 10^9$ (5% inoculation, incubated at 20° C.) after 24 hours.

Figure 2:
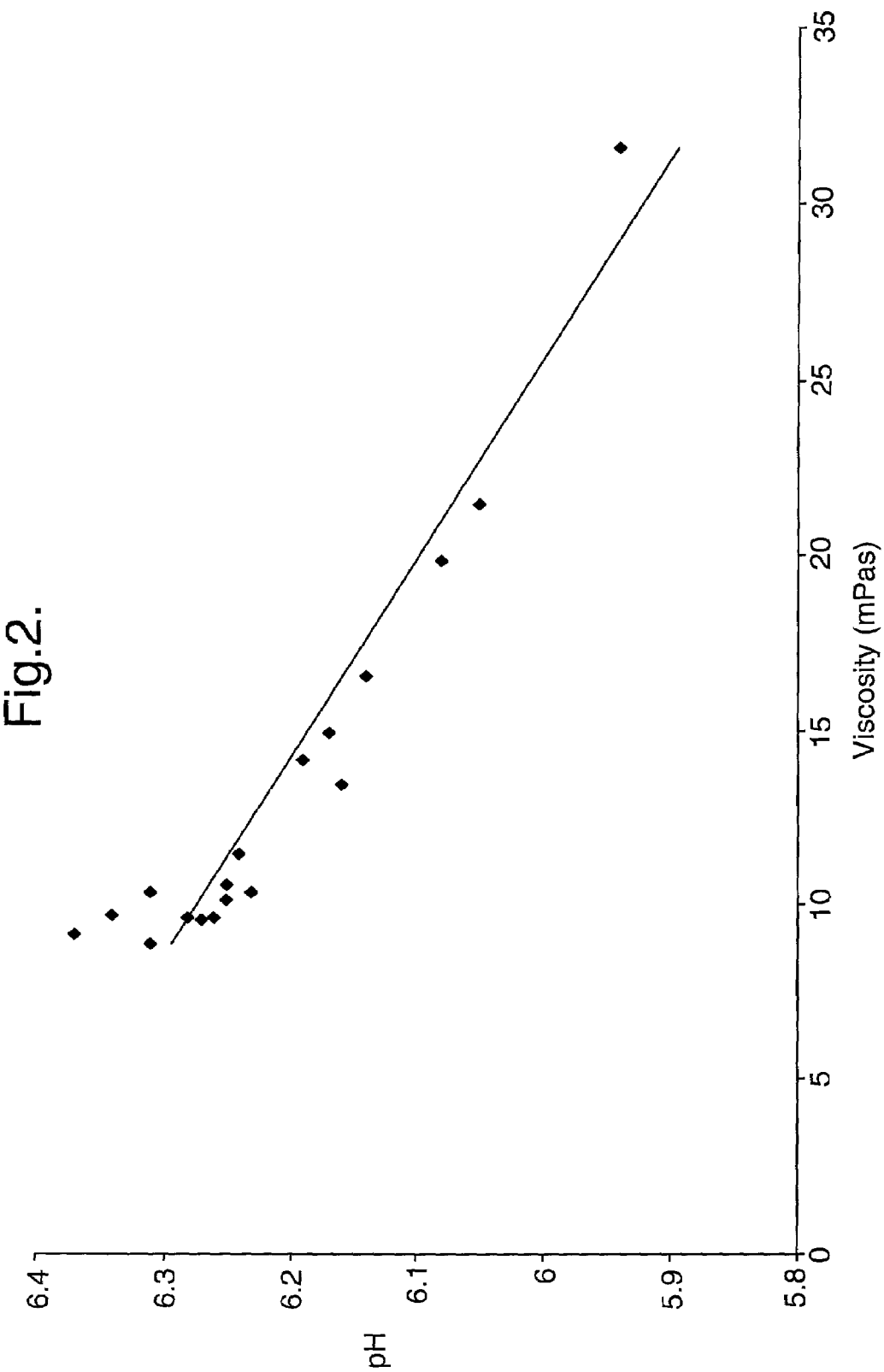
FIG. 2 shows the pH of an ice cream pre-mix, comprising 14% skimmed milk powder and 15% sucrose, fermented with *L. mesenteroides* ATCC10830A, as a function of the viscosity of the pre-mix. The viscosity was measured before pasteurisation, at a shear rate of 250 s$^{-1}$.

The initial pH of the pre-mix was 6.35 and this was found to have decreased to 6.23 (1% inoculation, incubated at 10° C.) or 5.88 (5% inoculation, incubated at 20° C.) after 24 hours. Under other conditions (e.g. 2% inoculation, incubated at 25° C. for 24 hours) it was found that fermentation with *L. mesenteroides* ATCC10830A could cause the pre-mix pH to fall at least as low as 5.5. By combining the data obtained from all conditions tested, an approximately linear correlation was observed between the pH of a fermented pre-mix sample and its viscosity, as shown in FIG. 2. The details of the pH dependence will, of course, depend on the starting pH and the specific formulation but the inventors have observed an approximately linear dependence of viscosity on pH for pre-mixes with a range of different compositions, always provided that the pH remains above a value where the pre-mix begins to gel. These results suggest that monitoring of the culture pH should provide a very convenient way of following the accumulation of polysaccharide in a production-scale implementation of the method.

EXAMPLE 5

Preparation of Ice Creams from Fermented and Unfermented Pre-Mixes

In order to test the eating quality of ice cream derived from a pre-mix that had been fermented with *L. mesenteroides* ATCC10830A, with that derived from unfermented pre-mix or pre-mix supplemented with a commercial, spray-dried dextran preparation, a number of formulations were prepared. The pre-mix compositions were as follows:

| Ingredient | Supplemented pre-mixes | Fermented and untreated pre-mixes |
|---|---|---|
| cream | 10.17 | 10.17 |
| condensed skimmed milk | 53.67 | 54.46 |
| sugar | 14.00 | 14.90 |
| corn syrup | 3.26 | 3.26 |
| Enrich 221/301[a] | 1.30 | 0.00 |
| water | 17.60 | 17.21 |
| Total solids | 36.90 | 36.70 |

[a]spray-dried dextran-containing products of Quest International Ltd.
All mixtures additionally contained vanilla flavour.

Two batches of the unsupplemented premix were fermented with *L. mesenteroides* ATCC10830A in a jacketed vessel. The incubation temperature was controlled by a tap water stream through the jack and manual temperature measurements. The cultures were stirred continuously and samples were taken aseptically for off-line pH- and viscosity measurements.

Fermentation A: The pre-mix was cooled after pasteurisation to 13.7° C. at inoculation. The incubation temperature rose shortly to 33° C. and was then kept at 15° C. As the temperature rose slowly the cooling level was adjusted and the stirring speed was reduced after 28 h of culturing. This resulted in a gradual temperature decrease to 3° C. after 36 h. After 42 h the temperature was adjusted to 10° C. After 45 h the pH had fallen to 6.2 and the fermentation was then stopped by pasteurisation.

Fermentation B: After pasteurisation, the pre-mix was cooled to 23° C. and inoculated with the preculture. The culture was then left without cooling. After 21 h the temperature had dropped to 20.4° C. and was then adjusted to 22° C. by a short pulse of hot water through the mantle of the vessel. The pre-mix pH dropped to 5.8, with a viscosity of 150 mPas (at a shear rate of 50 $s^{-1}$) after 25 h, at which point fermentation was stopped by pasteurisation, resulting in a viscosity increase to 210 mPa.s.

Various combinations of these fermented pre-mixes with unfermented pre-mix were prepared, and the viscosity and dextran content of these, as well as those of the premixes supplemented with Enrich 221 or 301, were determined. The results are summarised below:

| Pre-mix Code | Composition | Viscosity[a] | Dextran content[b] |
|---|---|---|---|
| 100 | untreated | 14 | 0 |
| 221 | +1.3% "Enrich 221" | 21 | 0.16 |
| 301 | +1.3% "Enrich 301" | 31 | 0.09 |
| 101 | fermentation A | 52 | 0.56 |
| 401 | fermentation B | 210 | 0.94 |
| 102 | 1:1 A + untreated | 23 | 0.22 |
| 402 | 1:1 B + untreated | 43 | 0.66 |
| 405 | 1:4 B + untreated | 23 | 0.26 |

[a]Expressed in mPa.s; determined at a shear rate of 50 $s^{-1}$
[b]Expressed as % (w/v), +/− 0.1%.

Each of these pre-mix formulations was converted to ice cream on a standard continuous scrape surface heat exchange MF75 freezer, with an over-run of around 100% being achieved in each case, except for pre-mix code 401, for which an over-run greater than 50% could not be obtained.

EXAMPLE 6

Sensory Analysis of Ice Cream Formulations

The ice cream samples prepared as described in example 5 were subject to a "Spectrum" sensory analysis of their texture and flavour properties, as perceived by a panel of trained tasters. For each formulation, the analysis was performed on both a fresh sample and a sample that had been subjected to temperature abuse, as described in example 1.

(i) Texture Data

Texture maps for the ice cream products derived from each of the pre-mix formulations listed above are shown in FIGS. 3 to 3B. In these maps the prefix S to each sensory quality indicates the perception of the surface of the ice cream, FC indicates the first compression (between tongue and palate), M indicates manipulation (in the mouth) and R indicates residual texture. The radial axis for each parameter is scored in arbitrary units, with 15 being a high rating for the attribute concerned.

The untreated pre-mix (code 100) yields an ice cream that shows marked, generally deleterious, changes in some sensory properties upon temperature abuse. In particular there is a clear increase in perceived "crystallinity" and other parameters likely to reflect the presence of ice crystals. Addition of either Enrich 221 (code 221) or Enrich 301 (code 301) reduces this sensitivity to temperature only partially. In situ generation of dextran is shown to be very effective in protecting against this textural deterioration upon temperature abuse. Thus, the pre-mix that had been subject to fermentation A (to pH 6.2) gave an ice cream (code 101) with a texture that showed improved texture compared to the untreated case even in a fresh sample, as well as much diminished sensitivity to temperature abuse. Dilution of this pre-mix with unfermented pre-mix in an equal proportion gave formulation 102, which had a viscosity comparable to that resulting from addition of 1.3% Enrich 221. The ice cream derived showed some sensitivity to temperature abuse, but noticeably less than that observed from the ice cream derived from pre-mix 221.

Fermentation B (to pH 5.8) gave a pre-mix (code 401) with a very high viscosity, for which only a limited over-run could be obtained when it was attempted to work it up into ice cream. The product had a very different texture to those of the other ice creams and, indeed, its structure was found to be very much like that of yoghurt. However dilution of this either 1:1 or 1:4 with unfermented pre-mix (to give pre-mixes 402 and 405 respectively) led to ice creams with good structure and texture and, most noticeably, very good resistance to deterioration upon temperature abuse. In the case of pre-mix 402, especially, the texture both before and after temperature abuse is better before and especially after temperature abuse, in terms of lower crystallinity, than either the ice cream prepared from untreated mix or those prepared from mixes supplemented with the spray-dried dextran product.

(ii) Flavour Data

Spectrum sensory maps showing the flavour profiles of ice creams derived from the pre-mix formulations described above are shown in FIGS. 4 and 4A.

The untreated pre-mix (100), as well as those supplemented with the spray-dried dextran additives (221 and 301) gave ice creams that show good profiles with no significant undesirable flavours detected. The undiluted, fermented premixes (101 and 401) gave ice creams with flavours that show some modification as a result of the bacterial action. Most significantly, there is an increased sourness that is pronounced for 401 but more marginal for 101. Importantly, however, the 1:1 diluted pre-mix 402 gave an ice cream in which these undesirable flavours were effectively suppressed, even though the desirable structuring and stabilising effects were, as shown above, retained.

EXAMPLE 7

Comparison of Polysaccharide Production by Different *Leuconostoc mesentoroides* Strains Two strains *Leuconostoc* ssp *mesenteroides* (ATCC 10830A) and *Leuconostoc mesenteroides* ssp *dextranicum* 605 (Danisco) were fermented with different levels of sugar and skimmed milk powder and the amount of polysaccharide produced was measured.

The following results were obtained:
(Dextran levels (% w/w of composition)

| Time, hrs | L. mesenteroides ssp mesenteroides | L. mesenteroides ssp dextranicum 605 |
|---|---|---|
| i) 14% sugar, 10% skimmed milk powder | | |
| 0 | 0 | 0 |
| 24 | 1.1 | 0.7 |
| 48 | 3.7 | 4.2 |
| ii) 20% sugar, 10% skimmed milk powder | | |
| 0 | 0 | 0 |
| 24 | 0.9 | 0.5 |
| 48 | 4.7 | 3.1 |
| iii) 14% sugar, 5% skimmed milk powder | | |
| 0 | 0 | 0 |
| 24 | 0.8 | 0.6 |
| 48 | 3.9 | 3.4 |
| iv) 20% sugar, 5% skimmed milk powder | | |
| 0 | 0 | 0 |
| 24 | 0.7 | 0.6 |
| 48 | 2.9 | 3.0 |

The results demonstrate that the rate of dextran production is broadly comparable for both strains tested. Pre-mix variation at these levels has little influence on the rate of dextran production.

EXAMPLE 8

Figure 5:
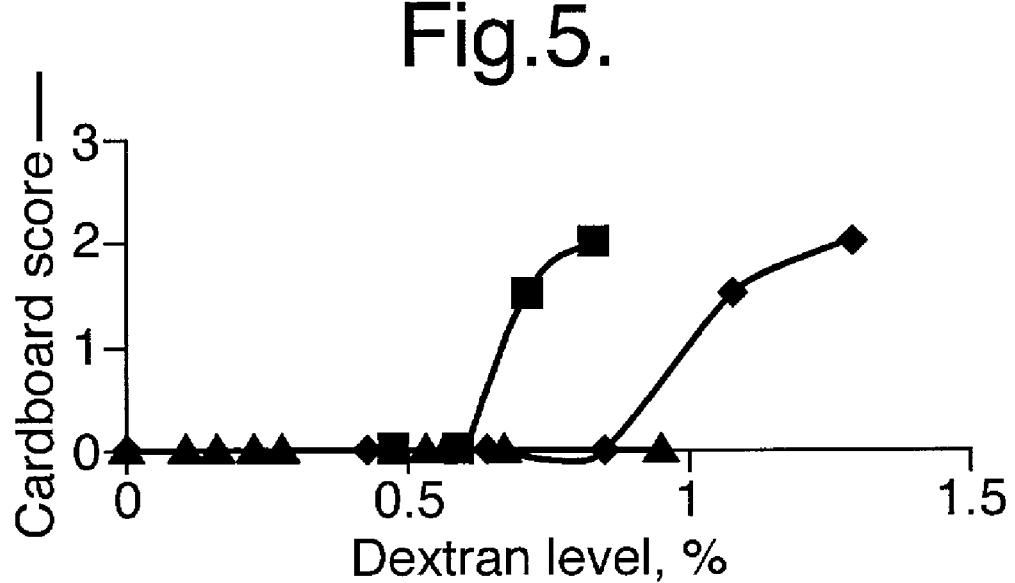
FIG. 5 shows the cardboard flavour scores obtained using Spectrum sensory analysis for low fat (■) and full fat (♦) ice creams containing dextran additive compared to a low fat dextran-containing ice cream where the dextran is produced in-situ in accordance with the invention (▲).

Comparison of Cardboard Flavour Scores for Ice Creams Containing Polysaccharide Additive with an in-situ Fermented Ice Cream Using the Spectrum sensory technique described above, cardboard flavour scores were derived for fresh full fat and low fat ice cream products containing Enrich 221 (spray dried dextran-milk powder, available commercially from Quest International) and equivalent low fat formulation containing in-situ produced dextran. The results obtained are presented in FIG. 5.

It can be seen that even at modest levels of dextran, cardboard off-flavours are apparent in the products containing polysaccharide additive. By contrast, the in-situ fermented product does not exhibit this cardboard flavour attribute. For the same level of dextran, the in-situ derived product has much lower off-flavours then the corresponding product prepared using spray dried additive.

The invention claimed is:

1. A method for preparing a milk-based composition comprising a homopolysaccharide comprising the steps of
  (i) fermenting a mixture comprising milk and a fermentable sugar with a homopolysaccharide-producing microorganism under anaerobic conditions, and
  (ii) stopping the fermentation while the pH of the mixture remains within the range of pH 5.7 and above to produce a fermented mixture,
the pH of the mixture being unregulated during fermentation.

2. A method according to claim 1 wherein the pH of the mixture remains within the range of pH 5.8 to 6.2 during fermentation.

3. A method according to claim 1 wherein the microorganism is a dextran- and/or fructan-producing lactic acid bacterium.

4. A method according to claim 1 wherein the microorganism is a lactic acid bacterium of the genus *Leuconostoc*.

5. A method according to claim 4 wherein the microorganism is a dextran-producing strain of *Leuconostoc mesenteroides* subspecies *mesenteroides* or subspecies *dextranicum*.

6. A method according to claim 5 wherein the microorganism comprises a strain selected from *Leuconostoc mesenteroides* subspecies *mesenteroides* ATCC 10830A, or *Leuconostoc mesenteroides* subspecies *dextranicum* 605.

7. A method according to claim 1 wherein the homopolysaccharide is produced in an amount of at least 0.3% by weight of the composition.

8. A method according to claim 1 wherein the mixture is inoculated with beadlets comprising the microorganism.

9. A method according to claim 1 wherein the fermentation is carried out at a temperature of from 10° to 30° C.

10. A method according to claim 1 wherein the fermentation is carried out for a period of from 4 to 48 hours.

11. A method wherein the fermented mixture prepared according to claim 1 is then diluted with a milk based non-fermented mixture.

12. The method according to claim 1 wherein the pH of the mixture remains within the range of pH 5.7 to 6.2 during fermentation.

* * * * *